Sept. 4, 1928.
V. BENDIX
LEVER
Filed Sept. 15, 1926
1,683,378
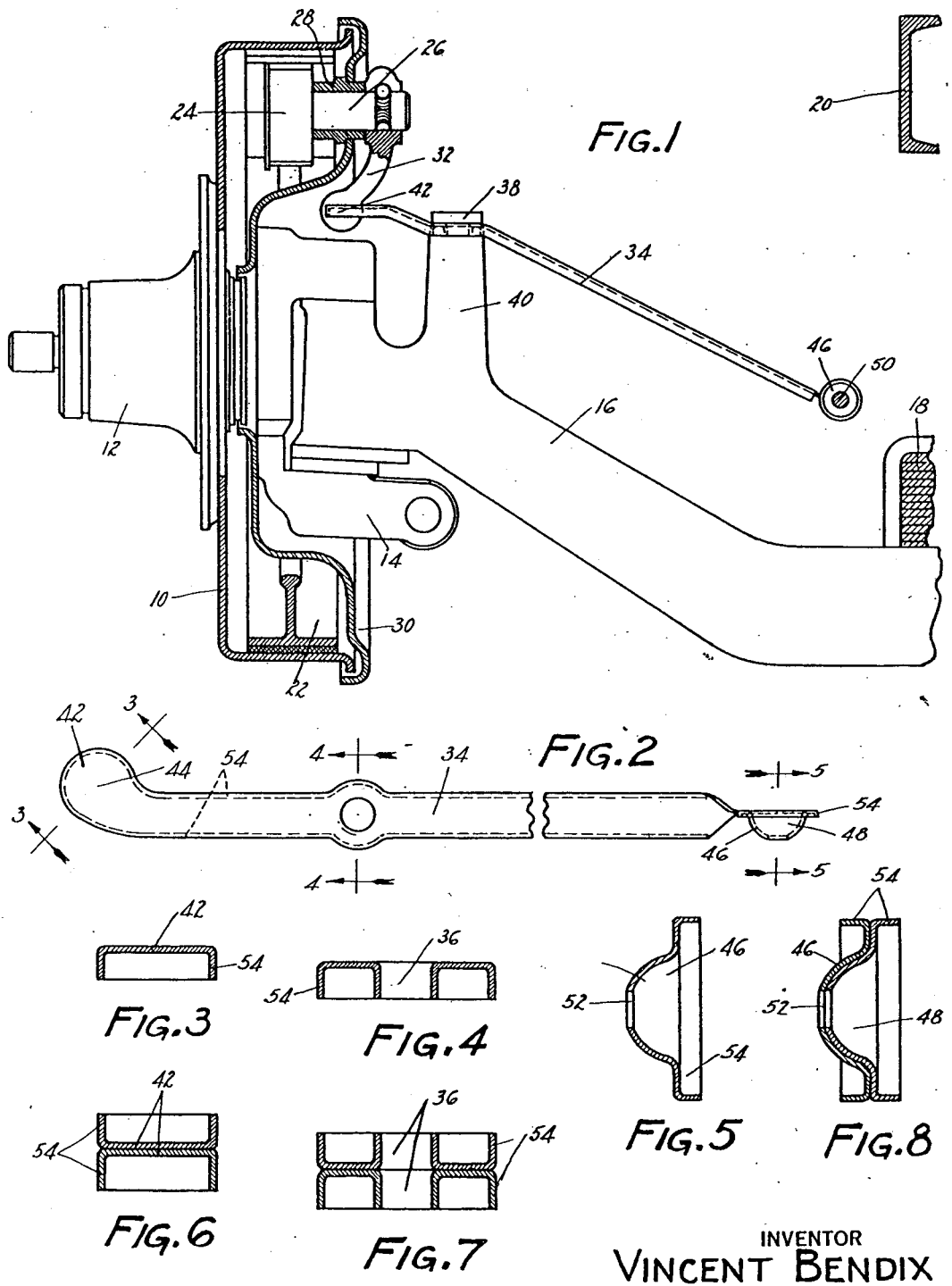
INVENTOR
VINCENT BENDIX
BY
M. W. McConkey
ATTORNEY Patented Sept. 4, 1928.

1,683,378

UNITED STATES PATENT OFFICE.

VINCENT BENDIX, OF CHICAGO, ILLINOIS, ASSIGNOR TO BENDIX BRAKE COMPANY, OF CHICAGO, ILLINOIS, A CORPORATION OF ILLINOIS.

LEVER.

Application filed September 15, 1926. Serial No. 135,538.

This invention relates to levers, especially of the type used for parts of the operating connections for automobile brakes, and is illustrated as embodied in a novel lever formed and mounted for operation to apply a brake on the swivelled front wheel of an automobile. An object of the invention is to provide a novel construction suitable for forming a strong lever which can be made as a stamping.

Preferably the stamping forming the lever is arranged to have a pivot bearing between its ends, so that its outer end swings in an arc over the kingpin of the wheel, and the outer end is formed with a thrust portion of circular arcuate horizontal outline projecting laterally from the lever so that an operating device which swivels with the wheel may turn on the arcuate outline without interfering with the swivelling of the wheel. If greater strength is desired, the lever may be made of two such stampings fastened back to back so that each one reinforces the other. I prefer to form the stampings with edge flanges which not only finish and reinforce the levers but which also serve to form cylindrical thrust flanges extending around the arcuate thrust part of the lever.

Another feature of the invention relates to twisting the opposite end of the lever into a plane at right angles with the top of the lever to facilitate its connection to brake-operating means. In the arrangement illustrated this twisted portion of the lever is dished to form a hemispherical socket to form part of a ball and socket joint attaching the lever to the brake-applying connection.

The above and other objects and features of the invention will be apparent from the following description of one illustrative embodiment shown in the accompanying drawing, in which:

Figure 1 is a vertical section through one front brake and through associated parts;

Figure 2 is a top plan view of the novel brake-applying lever;

Figure 3 is a section through the thrust end of the lever on the line 3—3 of Figure 2;

Figure 4 is a section through the pivot bearing formed on the lever on the line 4—4 of Figure 2;

Figure 5 is a section on the line 5—5 of Figure 2 showing the dished end of the lever; and Figures 6, 7, and 8 are views corresponding respectively to Figures 3, 4, and 5 but showing a modified form of lever built up of two stampings permanently secured back to back.

In the arrangement illustrated, the brake includes a drum 10 rotating with the wheel, the hub of which is shown at 12 and which is carried by a knuckle 14 swivelled by a kingpin or the like at one end of an axle 16. The axle 16, with a rear axle (not shown), serves through the medium of the usual springs 18 to support the chassis frame 20. Within the drum 10 is arranged a suitable brake 22 which may, if desired, be substantially as fully described in Patent No. 1,567,716, granted Bendix Brake Company December 29, 1925, on an application filed by A. Y. Dodge.

The brake may be applied by suitable means such as a double cam 24 having a short shaft 26 journalled in a bearing 28 carried by the backing plate 30 of the brake, and operated by means such as a crank arm 32 having a flattened end engaged by the thrust portion of the novel lever 34 which forms the subject-matter of the present invention.

The novel lever 34 is shown in rear elevation in Figure 1 and in top plan in Figure 2, and three sections through the lever are shown in Figures 3, 4, and 5. The lever is formed with an integral bushing or cylindrical flange 36 which serves as a bearing for a pivot 38 which mounts the lever on a fulcrum 40 shown as a boss projecting from the axle 16. The pivot 38 is so arranged that the outer end of the lever swings in an arc substantially intersecting the swivelling axis of the wheel. The outer end of the lever is formed as a forwardly projecting thrust portion 42 of circularly arcuate outline having its center 44 substantially in the swivelling axis of the wheel, or immediately adjacent that axis, when the brake is applied. Thus the flattened end of the crank arm 32 may roll around on the circular arc forming the edge of the thrust portion 42 without interfering with the swivelling of the wheel. The outer end of the lever is inclined upwardly from the pivot bearing 36 at an acute angle to the thrust portion 42, while the other or inner end of the lever is inclined downwardly from the pivot bearing 36 at an acute angle so that the lever substantially parallels the outer end of the axle 16 and terminates immediately adjacent the spring 18 just above the axle 16. I prefer to twist the extreme end of the inner part of the lever to form a portion 46 in a plane substantially perpendicular to the body of the lever and which is preferably dished at 48 to form a semi-spherical socket to receive a ball on the end of a tension member 50 extending through an opening 52 in the base of the socket.

As shown in Figures 6, 7, and 8, if it is desired to increase the strength of the lever, two stampings may be provided and spot-welded or otherwise secured back to back to form one unitary structure. I prefer to form each of the stampings as a channel-shaped member to provide edge flanges 54 extending entirely around the stampings and serving not only to stiffen the stampings but also serving where they pass around the thrust portion 42 as cylindrical bearing surfaces engaging the flattened end of the crank arm 32.

While two illustrative embodiments have been described in detail, it is not my intention to limit the scope of the invention to these particular embodiments or otherwise than by the terms of the appended claim.

I claim:

A brake-applying lever comprising a substantially flat stamping having a pivot bearing between its ends and formed at one end with a thrust portion, the opposite end of the stamping being twisted to a plane at right angles to the body of the lever and dished to form a semi-spherical socket adapted to form part of a ball-and-socket joint for attachment to operating connections.

In testimony whereof, I have hereunto signed my name.

VINCENT BENDIX.